2,830,908

FOOD COLOR AND METHOD OF PREPARING THE SAME

Marcel A. Perret, Rego Park, N. Y., assignor to Chas. Pfizer & Co., Inc., Brooklyn, N. Y., a corporation of Delaware No Drawing. Application May 9, 1955
Serial No. 507,124

5 Claims. (Cl. 99—148)

This invention is concerned with a novel method for the preparation of pigments useful in food products. This invention is also concerned with the novel pigments and with food products containing these. In particular, it is concerned with the preparation of a new pigment by modification of esters of the known polyenedicarboxylic acid which occurs in nature as the monomethyl ester, bixin.

A variety of compounds have been utilized for coloring food products to improve their appearance and acceptability. Among these materials are various vegetable dyes and synthetic organic dyes of suitable hue. Bixin is a naturally-occurring pigment of reddish-orange color which occurs in various plants, particularly in the seeds of *Bixa orellana*. This compound is a monomethyl ester of a polyenedicarboxylic acid whose structure is known. Although bixin has some value as a coloring matter, particularly for fatty foods such as margarine or butter, this utility is definitely limited by its low solubility in oils and fats.

In a copending patent application Serial No. 458,673, filed on September 27, 1954, by Marcel A. Perret, a process for the preparation of a new type of pigment by heating bixin in oily media at a temperature of at least about 130° C. was described. It has now been found that even more valuable pigments may be obtained by heating an ester of bixin or a di-ester of the parent polyenedicarboxylic acid in a liquid medium at a temperature of substantially between 95° C. and 125° C., a range definitely below that used most successfully with bixin itself. The solubility of these new products is definitely increased over that of bixin or of the bixin ester or nor-bixin di-ester that is utilized as a starting material.

When reference is made herein to a bixin ester, it is to be understood that this term means an ester of the naturally-occurring monomethyl ester with aliphatic alcohol having from one to about twenty carbon atoms. These starting materials may be prepared by any of a number of conventional processes of esterification utilizing the desired alcohol and bixin or suitable forms of these compounds. When reference is made to "a nor-bixin di-ester," this term is meant to include esters of nor-bixin (which is prepared by gentle hydrolysis of bixin to remove the methyl ester group) with two alcohol groups having between one and about twenty carbon atoms. The same or a different ester group may be substituted on the two carboxyl groups of nor-bixin. For example, the diethyl ester of nor-bixin may be utilized. Other esters of value are the dipropyl, the propylbutyl, propylamyl, butyllauryl, dilauryl, di-isobutyl, and other esters. These esters may be made by conventional processes of esterification or transesterification. Furthermore, mixtures of the bixin esters or of nor-bixin di-esters may be utilized in the preparation of the products of the present invention.

The process of the present invention is operated by subjecting the starting material, that is, a bixin ester or a nor-bixin di-ester, to the action of an elevated temperature of between about 95° C. to 125° C., preferably 100° C. to 120° C., in a liquid medium for a limited time. The type of ester, the medium, the temperature and the time of exposure at the elevated temperature all are interrelated in their effect upon the development of the highly desirable properties of the new type of product. Prolonged exposure to the elevated temperature utilized in the present process tends to decrease, to a certain extent, the pigmentary power of the product without further increasing the desired higher solubility of the product in oily materials. In general, a minimum of about 30 seconds exposure is desirable and exposure of not greater than about one-half hour is favored. The optimum time as indicated above depends upon the medium, the specific temperature and other features. However, in general, a time of from about one to about ten minutes is often most effective.

The process is operated with the bixin ester or nor-bixin di-ester suspended or dissolved in a liquid medium. These media include vegetable oils, fats, hydrogenated vegetable oils, fatty acids, esters of fatty acids, and waxes. In general, any liquid medium is useful which is an ester of a higher fatty acid (i. e. a carboxylic acid of more than 8 carbons) and does not decompose the starting material or product at the temperature of the reaction and which boils above the reaction temperature to be used. In many cases, it is possible to carry out the reaction of the present invention in a medium which may be utilized directly in food products. Thus, edible oils, fats or hydrogenated oils are quite suitable for this purpose. Such materials include peanut oil, cottonseed oil, sesame oil, hydrogenated cottonseed oil, hydrogenated peanut oil, cocoa butter and so forth.

In operating the present process, a concentration of the bixin ester or nor-bixin di-ester in the desired medium of from about 0.5 to about 5 grams per 100 cc. of medium is satisfactory. More dilute mixtures may be utilized, but, in general, there is no advantage to these.

It has been found that, upon operating the present process, the bixin ester or nor-bixin di-ester is transformed to a new type of substance which has improved physical properties. In particular, the solubility of the new type of substance is appreciably increased in oils and fats. Some alteration of other properties may result. However, the pigmentary power of the starting material is retained to a useful extent.

As noted above, when the present process is operated in an oily medium which is edible, the product obtained after the process has been completed may be added directly to food products in the desired amount to impart a yellow or orange color. If a hydrogenated oil or fat is used which is solid at room temperature, the mixture may be cooled and divided into convenient portions to be added to the food product which is to be colored. If a material of sufficiently high melting point is used as the medium, the chilled product may be pulverized and the finely divided solid containing the pigmentary substance is then readily soluble in margarine or other fatty food substances. In general, in processing margarine, temperatures of up to about 50° C. are utilized, in which case the solid pigment-containing fat or hydrogenated oil may be added directly to the warm margarine wherein the coloring matter is easily dispersed. After the present process of heat treatment has been completed and the reaction product is cooled to room temperature or slightly thereabove, there may be incorporated with the pigment various vitamins, particularly fat-soluble vitamins, e. g., vitamins A, D, E, K, etc. An antioxidant, particularly one which has solubility in oils or fats, may also be incorporated. Among the products which are particularly useful for this purpose are alkylated phenols such as 3-tertiary butyl-4-hydroxyanisole, 2-tertiary butyl-4-hydroxyanisole, 2,6-di-tertiary butyl-4-methyl phenol, 2,2'-methylenebis-(4-methyl-6-tertiary butyl phenol), tertiary butyl meta-cresol, 2,5-di-tertiary butyl hydroquinone, structurally related compounds and mixtures of these.

The process of the present invention is conducted by heating the starting material, that is, a bixin ester or a nor-bixin di-ester, in a suitable medium for the required period. This operation may be conducted in glass apparatus or in suitable metal equipment. It is desirable to include an agitator in the equipment so that the batch of material may be uniformly heated and quickly cooled after the reaction has been completed. It is desirable to have the equipment so constructed that the mixture may be rapidly raised to the desired reaction temperature and then rapidly cooled below the reaction temperature to avoid undue exposure to elevated temperatures. If larger quantities are to be handled, it is desirable to operate the process in a continuous manner, that is, by passing the reaction mixture of the bixin ester or nor-bixin di-ester or mixtures of these in the reaction medium through a heated zone in a narrow stream. Initially, the temperature is raised just sufficiently to liquefy the mixture. The mixture may then be exposed for a carefully controlled time to the desired elevated temperature to complete the reaction and the stream of reacted mixture may then be rapidly cooled by passing through a heat-exchange zone. In general, a temperature of about 50° C. is all that is required to liquefy most of the media that are used for the present process. This temperature may be achieved by heating the reaction mass in a tank with a suitable agitator before passing a stream of the reaction mixture through a tube or pipe of suitable dimensions. The reaction may be conducted with the tube or pipe in coil form or any other suitable shape immersed in a bath equipped with controlling devices and heating devices to maintain the proper temperature. The heated reaction mixture may then be passed out of the heated zone to a cooling zone where it is rapidly cooled to a temperature of 50° C. or lower. A substance which is normally solid at room temperature is used as the reaction medium. The reaction product should be maintained in a fluid state until it can be delivered to suitable packages or chilled and pulverized in suitable apparatus. Such a product may be sprayed or dropped into a gaseous or liquid atmosphere in which it is not soluble. By proper control of the apparatus used for spraying or dropping the mixture into the cooled zone, the reaction product may be obtained in granules or powder of a desired size. These may then be readily measured out and used in this form for coloring foodstuffs of various kinds. The proportion of material is readily controlled.

The novel type of product formed by the present process, although it has not been isolated in highly purified, crystalline form, has characteristic valuable properties, particularly elevated solubility in oils and fats. It also possesses increased solubility in certain organic solvents particularly non-polar, lipophilic organic solvents such as aliphatic and aromatic hydrocarbons, ethers and halogenated aliphatic hydrocarbons. The mechanism of the reaction resulting in the new type of product has not been clarified. It is not certain whether there is a single reaction or a series of reactions resulting in the formation of the new type of product.

The following example is given by way of illustration and is not to be regarded as a limitation of this invention, many variations of which are possible without departing from the spirit or scope thereof.

*Example*

Two hundred pounds of hydrogenated cottonseed oil with a melting point of 60° C. was heated to 110° C. To the melted material was added 8 pounds of ethyl bixin crystals. The mixture was stirred for 30 minutes at a temperature of 110° C. The mixture was then allowed to cool to a point slightly above its melting point, that is, about 75° C. It was then sprayed from a nozzle into a tower through which passed chilled air in an upward direction. The mixture was sprayed under a pressure of 120 p. s. i. nitrogen pressure. The material was completely sprayed into the tower in a period of 45 minutes. The beadlets were collected at the bottom of the tower. A total of 203 pounds of the beadlets were obtained. It was found that 78% of the pigmentary power of the ethyl bixin was retained during the process. The beadlets were found to be a highly fat-soluble form of coloring matter useful for pigmentation of food materials such as margarine.

What is claimed is:

1. A process for the preparation of a pigment, which comprises heating at a temperature of substantially between 95° C. and 125° C. a compound chosen from the group consisting of a bixen ester and a nor-bixin di-ester in a liquid medium comprising an ester of a higher fatty acid.

2. A process as claimed in claim 1 wherein the medium is chosen from the group consisting of vegetable oils, fats and hydrogenated vegetable oils.

3. A process for the preparation of a pigment, which comprises heating a compound chosen from the group consisting of a bixin ester and a nor-bixin di-ester in a liquid medium consisting of an ester of a higher fatty acid at a temperature of substantially between 95° C. and 125° C. for a period not exceeding one hour.

4. A pigment prepared according to the process of claim 1.

5. A vegetable-coloring material which comprises the product obtained by heating a compound chosen from the group consisting of a bixin ester and a nor-bixin di-ester at a temperature substantially between 95° C. and 125° C. in a hydrogenated vegetable oil normally solid at room temperature and chilling the resulting product in finely divided form.

References Cited in the file of this patent

UNITED STATES PATENTS

| | | |
|---|---|---|
| 59,975 | Dake | Nov. 27, 1866 |
| 163,610 | Rorick | May 25, 1875 |
| 1,203,594 | Ellis | Nov. 7, 1916 |
| 1,507,820 | Files | Sept. 9, 1924 |
| 2,768,198 | Marbet et al. | Oct. 23, 1956 |

OTHER REFERENCES

Chem. Abs., vol. 47, 1953, page 10146c.

"The Chemistry of Synthetic Dyes," by Venkataraman, vol. II, Academic Press, Inc., New York, 1952, page 1277.